United States Patent
Bryg et al.

[11] Patent Number: 6,128,706
[45] Date of Patent: Oct. 3, 2000

[54] APPARATUS AND METHOD FOR A LOAD BIAS—LOAD WITH INTENT TO SEMAPHORE

[75] Inventors: William R. Bryg, Saratoga; Stephen G. Burger, Santa Clara; Gary N. Hammond; Michael L. Ziegler, both of Campbell, all of Calif.

[73] Assignee: Institute for the Development of Emerging Architectures, L.L.C., Cupertino, Calif.

[21] Appl. No.: 09/018,165

[22] Filed: Feb. 3, 1998

[51] Int. Cl.⁷ .................................................. G06F 13/00
[52] U.S. Cl. .......................... 711/141; 711/144; 711/145; 711/146
[58] Field of Search ...................................... 711/119, 120, 711/141, 150, 156, 145, 130, 144, 146; 707/8; 710/110; 712/220; 365/230

[56] References Cited

U.S. PATENT DOCUMENTS

| | | | |
|---|---|---|---|
| 5,228,136 | 7/1993 | Shimizu et al. | 711/141 |
| 5,291,442 | 3/1994 | Emma et al. | 711/120 |
| 5,442,758 | 8/1995 | Slingwine et al. | 707/8 |
| 5,544,345 | 8/1996 | Carpenter et al. | 711/150 |
| 5,551,005 | 8/1996 | Sarangdhar et al. | 711/145 |
| 5,574,922 | 11/1996 | James | 712/220 |
| 5,615,167 | 3/1997 | Jain et al. | 365/230 |
| 5,727,172 | 3/1998 | Eifert et al. | 710/110 |
| 5,742,785 | 4/1998 | Stone et al. | 712/217 |
| 5,895,495 | 4/1999 | Arimilli et al. | 711/156 |
| 5,946,709 | 8/1999 | Arimilli et al. | 711/119 |

*Primary Examiner*—John W. Cabeca
*Assistant Examiner*—Fred F. Tzeng

[57] ABSTRACT

Apparatus and method for efficiently sharing data in support of hardware cache coherency and coordinated in software with semaphore instructions. Accordingly, a new instruction called "Load-Bias" which, in addition to normal load operations, requests a private copy of the data, and hints to the hardware cache to try to maintain ownership until the next memory reference from that processor. When used with the Cmpxchg instruction semaphore operation, the Load-Bias instruction will reduce coherency traffic, and minimize the possibility of coherency ping-ponging or system deadlock that causes the condition in which no processor is getting useful work done.

15 Claims, 6 Drawing Sheets

APPARATUS AND METHOD FOR A LOAD BIAS—LOAD WITH INTENT TO SEMAPHORE

BACKGROUND OF THE INVENTION

1. Field of the Invention

The present invention generally relates to an apparatus and method for efficiently sharing data in support of hardware cache coherency and coordinated in software with semaphore instructions.

2. Description of Related Art

Multiprocessor systems are used to increase performance over single processor systems, by having more than one processor working on a problem at a time. In order to work effectively, data sharing is supported by hardware cache coherency and coordinated in software with semaphore instructions.

Hardware cache coherency insures that software running on different processors have a consistent view of what is the current value of all memory data, even though each processor has a cache of a portion of that data. In a typical coherency system, a processor may obtain data as shared copy or as a private copy.

More than one processor may simultaneously have a shared copy of the same block of data, and all shared copies of the same data will be identical. A shared copy can be used to satisfy all read requests, caused typically by load instructions, but cannot be modified as necessary to satisfy a store instruction or semaphore instruction.

Only a single processor may have a private copy of data at a time, which is guaranteed to be the only copy of the data, i.e. no other shared copies existing. A private copy of data can be used to satisfy both read requests and modification requests.

If a processor has a valid copy of data in its cache, with the sufficient level of ownership, the time required to execute an instruction that accesses the data in the cache is small, typically one to several cycles. On the other hand, if the cache does not have the data, or the level of ownership is insufficient, an external request must be issued to obtain the data and/or the ownership to satisfy the instruction. That external request is much slower than the cache resident case, often 10 to 100 times slower.

In order for software to coordinate the sharing of data, there are special "semaphore" operations that typically read and modify a data location "atomically," where hardware guarantees that no other processor has access to the data location between the read and the modification.

Even though semaphore operations are a very small portion of the instruction mix, they cause a significant portion of the coherency traffic, including cache misses and private ownership requests. Since semaphore operations are used to support data sharing, it is likely that the data requested for a semaphore operation is currently resident in another processor. For certain types of semaphore operations, for example the Cmpxchg instruction, two coherency operations are typically required for a single semaphore operation, which is twice the amount of overhead than is desirable.

As shown in FIG. 1, a typical semaphore process utilizes a load and a Cmpxchg instruction. The Cmpxchg instruction is often used when the new value of a semaphore data is dependent on the previous value. Thus, the semaphore process will typically "load" the current value of the semaphore data, as shown at step 11, perform the computation, as shown at step 12, then issue a Cmpxchg instruction to test if the data location is private at step 13. If the test, at step 13, indicates that the data location is private, step 15 then tests if the current value of the semaphore data is the same value that was "loaded". If the test indicates that the value is the same value as "loaded," then the new value is stored into the semaphore location, at step 16. If however, the value is not the same value as "loaded," then the "condition" will indicate a bad data access, at step 17.

In practice, a load instruction only requires shared ownership to complete, and will request shared ownership in its coherency operation, as indicated in step 11. Later, when the Cmpxchg instruction is executed, as shown at step 13, the Cmpxchg instruction requires private ownership, so a second coherency operation must at that point be issued to complete the Cmpxchg instruction, as shown at step 14. At that time, the test at step 15 is performed to check that the current value of the semaphore data is the same value as "loaded," and the process continues as described above. Other semaphore operations may have the same problem, depending on the usage.

As shown in FIG. 2, one semaphore process implementation that addressed this problem in the past is the Load-Linked/Store-Conditional pair of instructions in the MIPS architecture. The Load-Linked instruction would gain private ownership of a cache line while satisfying the load, and mark the cache in a particular "linked" state, as shown at step 21. If after performing the computation, as shown at step 22, the accessed line stays resident in the processor's cache until the Store-Conditional instruction is executed, as shown at step 23, then the store will complete and the "condition" will indicate success at step 24.

Load-Linked/Store-Conditional semaphore process has a major disadvantage in that when there are multiple processors trying to operate on the same semaphore, another Load-Linked/Store-Conditional pair of instructions can grab the semaphore location away. Then, when the Store-Conditional test instruction is executed, as shown at step 23, the "condition" will indicate a bad data access, as shown in step 25, thereby raising the possibility that no processor will succeed in actually storing to the semaphore and causing system deadlock to occur, thus preventing forward progress.

Heretofore, processors have lacked the ability to indicate to the hardware cache the need to try and maintain private ownership. Accordingly, it is desirable to have a new instruction called "Load-Bias" which, in addition to normal load operation, requests a private copy of the data, and hints to the hardware cache to try to maintain private ownership until the next memory reference from that processor.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an apparatus and method for implementation of a new instruction called "Load-Bias" which, in addition to normal load operation, requests a private copy of the data to be loaded, and hints to the hardware cache to try to maintain private ownership until the next memory reference from that processor.

In the preferred embodiment, the Load-Bias feature instructs the cache to acquire the data to be loaded as private, and maintain the data loaded as private, until an event occurs to cause the cache to release the private status. When the Load-Bias instruction is used with the Cmpxchg instruction semaphore operation, the Load-Bias instruction will reduce coherency traffic, and minimize the possibility of coherency ping-ponging or system deadlock, in which no processor is accomplishing useful work.

BRIEF DESCRIPTION OF THE DRAWINGS

The accompanying drawings incorporated in and forming a part of the specification illustrate several aspects of the present invention, and together with the description, serve to explain the principles of the invention. In the drawings.

Figure 1:
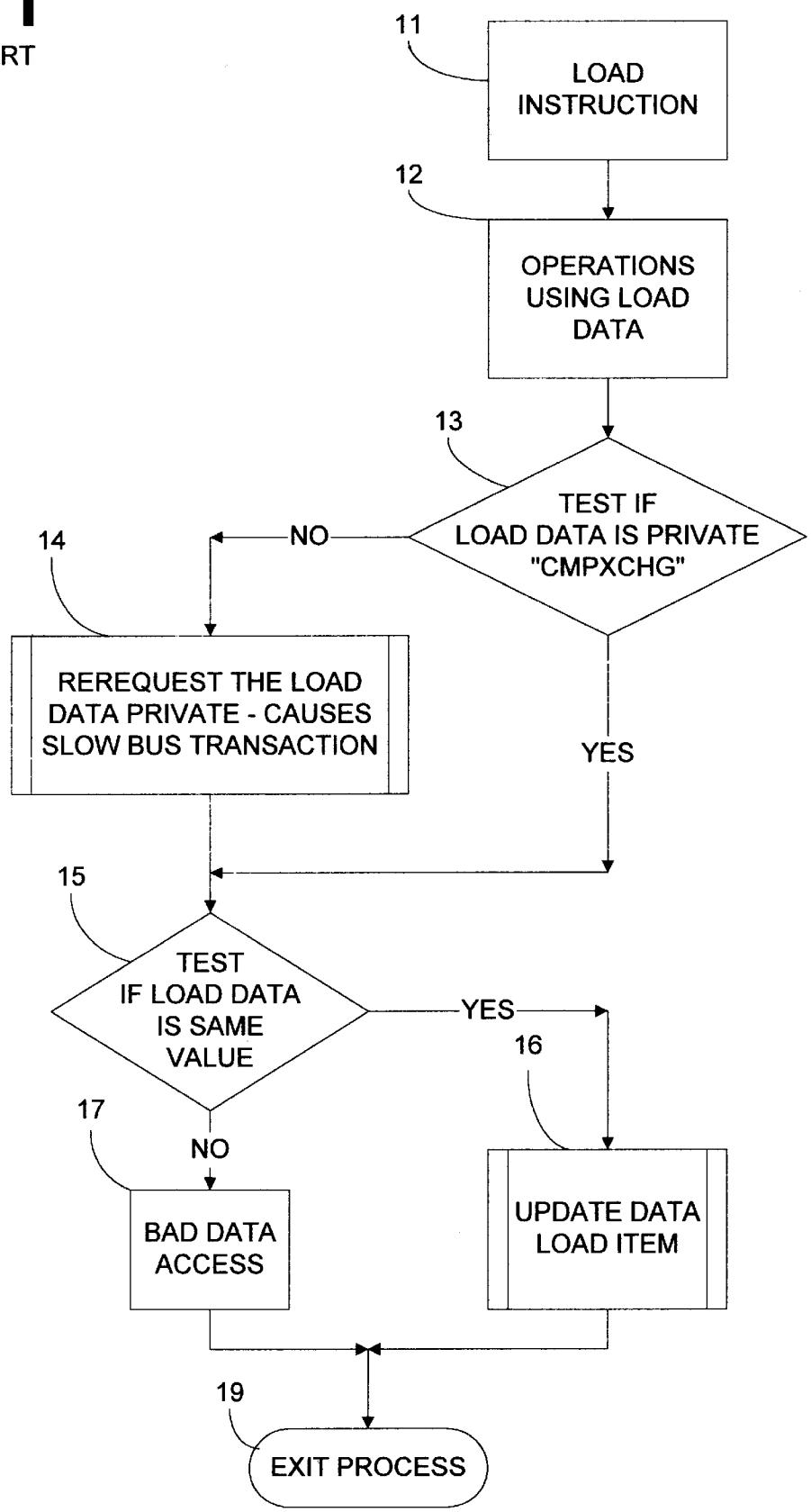
FIG. 1 is a flow chart of a semaphore process utilizing a load and compare and exchange pair of instructions without the present invention.
Figure 2:
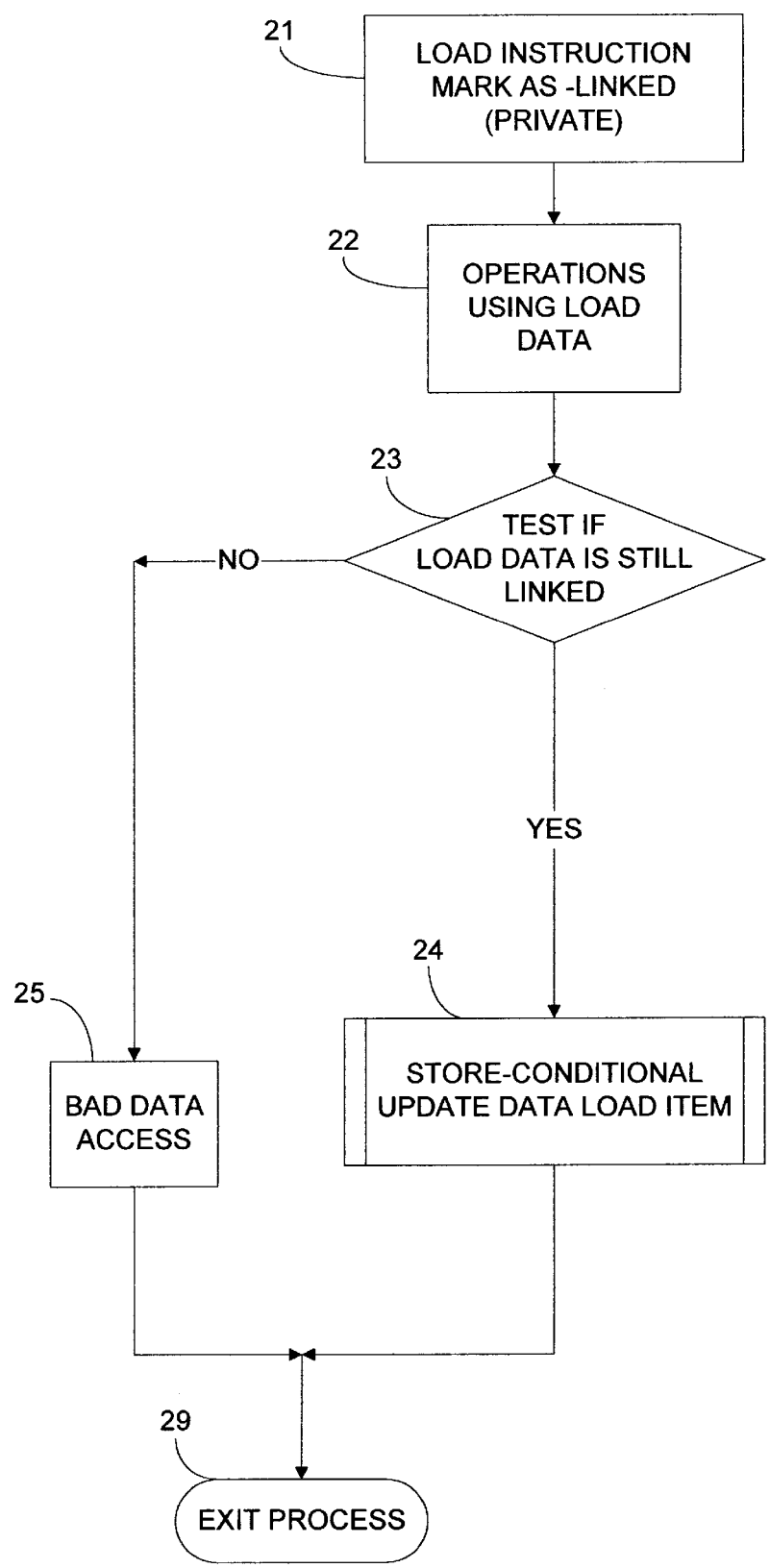
FIG. 2 is a flow chart of a semaphore process to implement Load-Linked/Store-Conditional pair of instructions.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENT

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 3:
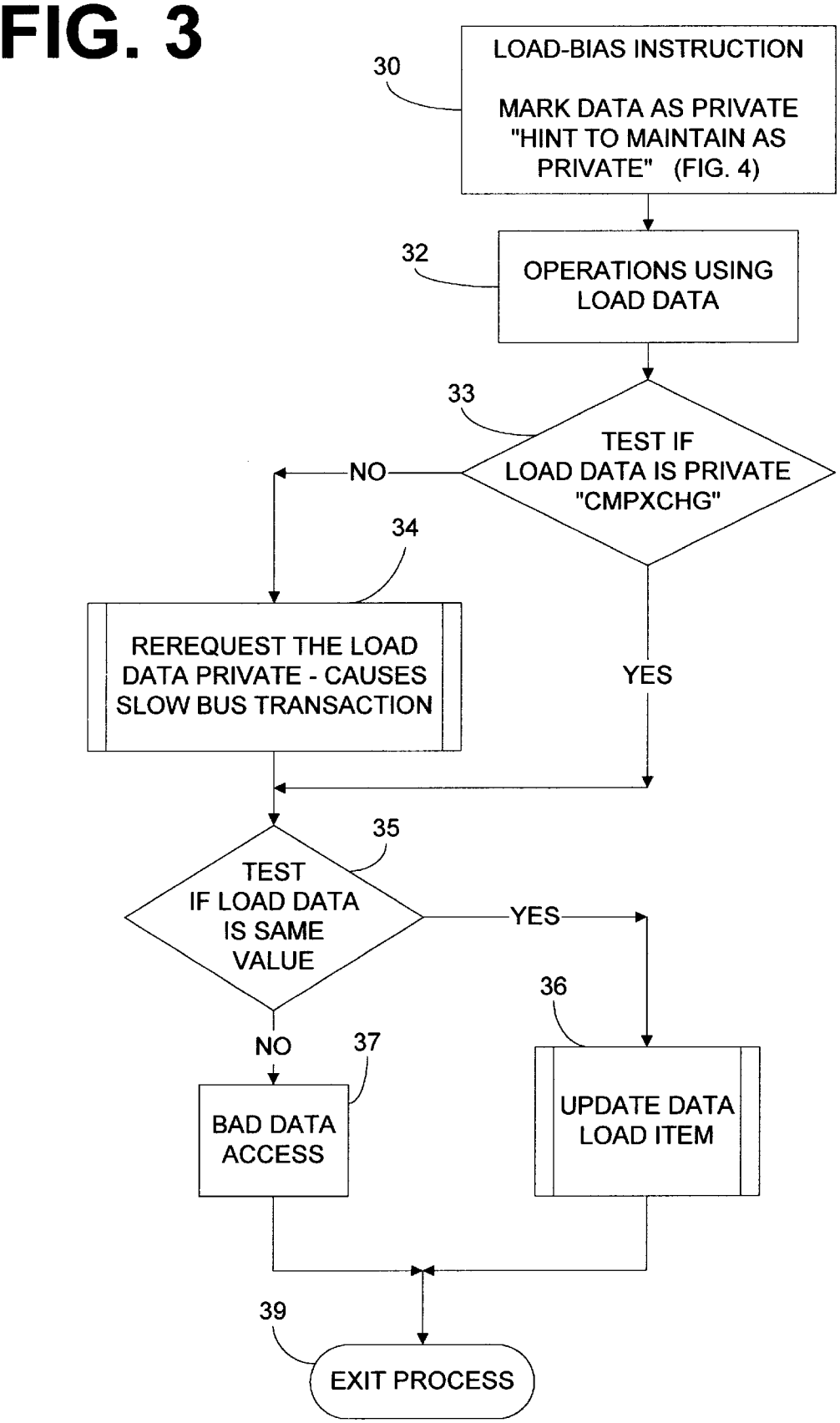
FIG. 3 is a flow chart of a semaphore process utilizing a load, and compare and exchange pair of instructions, with the load-bias hint of the present invention.

As shown in FIG. 3, when semaphore process utilizes the Load-Bias instruction and requests a exclusive private copy of addressed location at step 30, there is typically only a single coherency operation needed to semaphore the addressed location that previously resided in another processor. This is due to the fact that the Load-Bias instruction hints to the cache to acquire and maintain the data location as exclusive private. The Load-Bias instruction is explained in detail hereinafter with reference to FIG. 4.

The typical semaphore process utilizing the Load-Bias instruction will "load" the current value of the semaphore data as private, as shown at step 30. The semaphore process then typically performs a computation, as shown at step 32, then issues a Cmpxchg instruction to test if the data location is still private at step 33. By utilizing the Load-Bias instruction, the test at step 33, now almost always indicates that the data location is still private, thus allowing the process to execute without the causing the very slow external delay. The process then continues as noted above with regard to FIG. 1.

Figure 4:
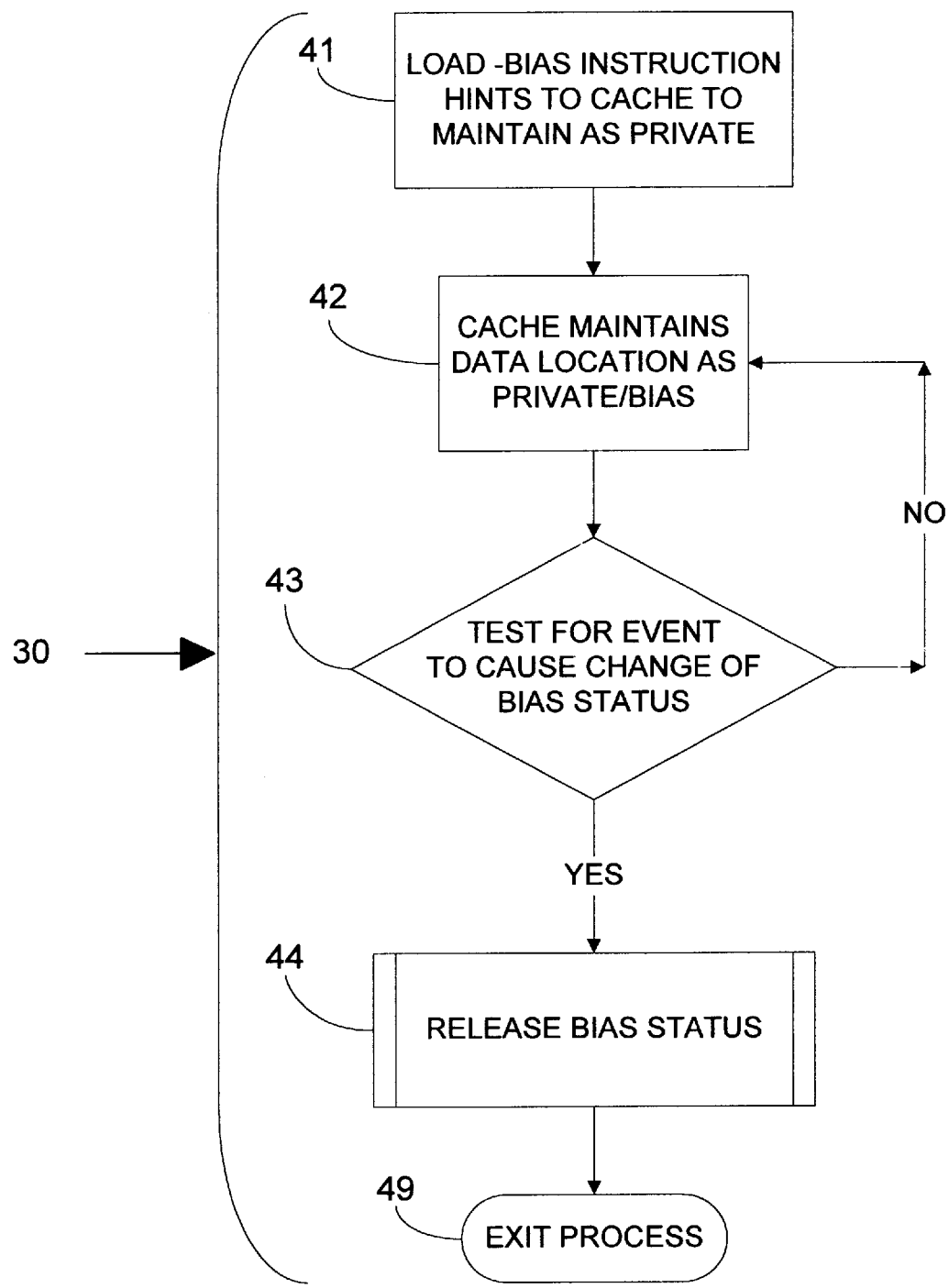
FIG. 4 is a flow chart of the operation of load-bias hint instruction utilized by the present invention.

Referring to FIG. 4, illustrated is a flow chart of the process of the Load-Bias instruction and the hints to the cache to acquire and maintain the data location as exclusive private. The Load-Bias instruction first requests a exclusive private copy of addressed location at step 41. Next, the Bias feature instructs the cache to maintain the data location as exclusive private until a status changing event occurs at step 42. In step 42, if the cache is under bias for a data location, then when a snoop to the cache is detected for that data location that is held under bias, the processor then queues (not shown) all the new snoops with regard to that data location. If the system requires that all snoops be processed in the order received, the processor will queue all snoops when a snoop location held under bias is detected. The snoops are held until the bias status is released for one of three reasons discussed in step 43. The cache tests for an event that would cause the data location being maintained as under bias, to be released from under bias at step 43. The data location being maintained as under bias is released from bias status at step 44. These events 43 are processor implementation specific, but may include the following testing routines.

The preferred embodiment for step 43 includes methods and apparatus utilized when testing for an event that requires a data location currently being held in bias status to be released. The first event that would cause a change in bias status is the execution of the semaphore access, i.e. Cmpxchg, that signals that the semaphore operation has been completed and that the bias status for a particular data location is to be released due to the successful completion of the semaphore operation.

The next event that would cause a change of status for a data location held in cache includes a delay timer function that would be set upon acquisition of the data location as exclusive private. The data location would be held as under bias, until expiration of the timer.

A third event that would cause a change of bias status for a data location includes detecting a bus access by the processor that requested the cache maintain the data location under bias. If another bus access occurs, then the cache would release the bias status for the data location thereby avoiding a potential deadlock situation.

Those skilled in the art know of several other ways to accomplish this testing for an event that would require the data location being held in a bias state to be released.

Figure 5A:
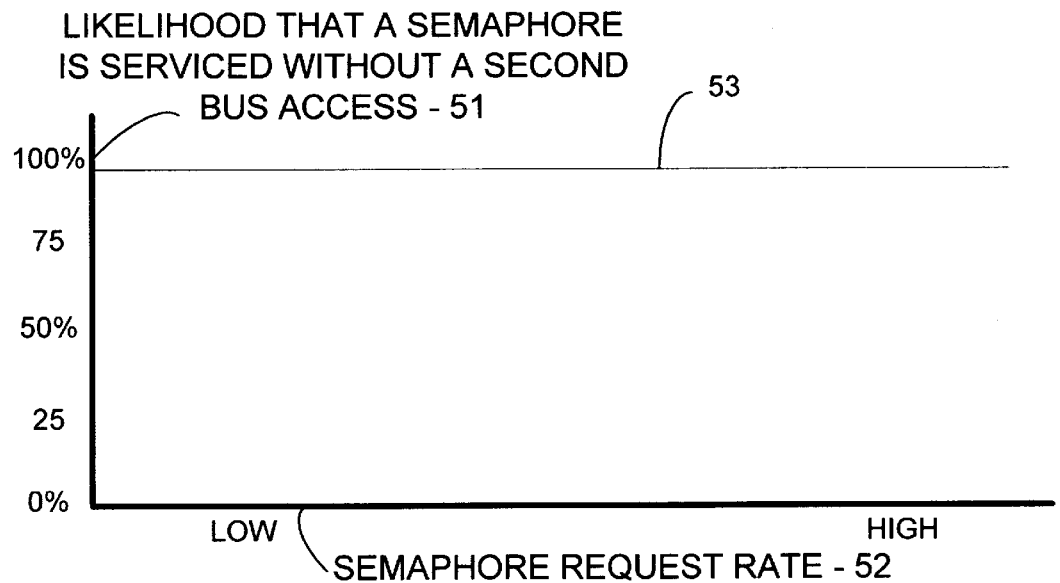
FIG. 5A is a chart that show the operational success of semaphore process utilizing the load-bias hint, and compare and exchange pair of instructions of the present invention.

The effectiveness of the Load-Bias instruction can be illustrated as a graph as shown in FIGS. 5 (A&B). FIG. 5A, illustrates that a semaphore operation success rate 53, is almost always successful when utilizing the Load-Bias instruction that is programmed properly. This is explained by the graph in FIG. 5A, for example, there is no decrease in the likelihood that a semaphore is serviced without a second bus address 51, when the semaphore request rate 52 increases as shown on graph line 53, as the operational success of semaphore process.

Figure 5B:
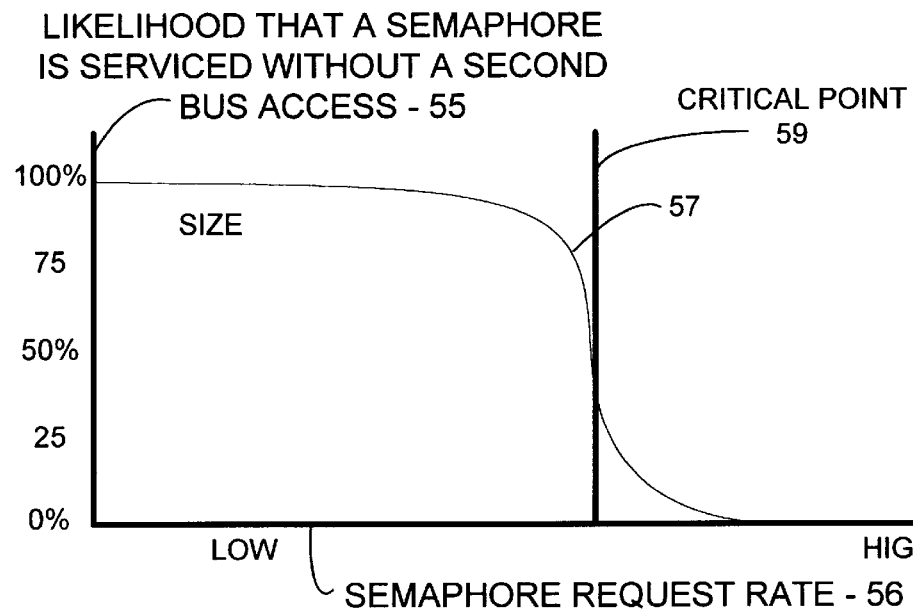
FIG. 5B is a chart that show the operational success of semaphore process utilizing a load, and compare and exchange pair of instructions without the present invention.

Whereas, FIG. 5B shows that an increase in the rate of semaphore requests 56 has a dramatic adverse affect on the operational success of semaphore process 57, that is utilizing a load, and compare and exchange pair of instructions without the Bias feature of the present invention. As further illustrated in FIG. 5B, the operational success of semaphore process 57 shows that the likelihood that a semaphore is serviced without a second bus access 55 falls off to zero as the semaphore request rate 56 increases to a critical point 59. After the semaphore request rate 56 increases past the critical point 59, the semaphore request rate 56 must then decrease significantly past the critical point 59 for the semaphore operation success rate, shown on graph line 57, to recover.

The Load-Bias/Cmpxchg pair of instructions have an advantage over Load-Linked/Store-Conditional pair of instructions in those cases where several processors are trying to access the semaphore location simultaneously. With Store-Conditional, the data location must be kept resident in the cache in order to succeed, regardless whether another processor actually modified the data. The Cmpxchg instruction, on the other hand, compares only whether the data value has actually changed in order to determine whether to modify the semaphore location.

Figure 6:
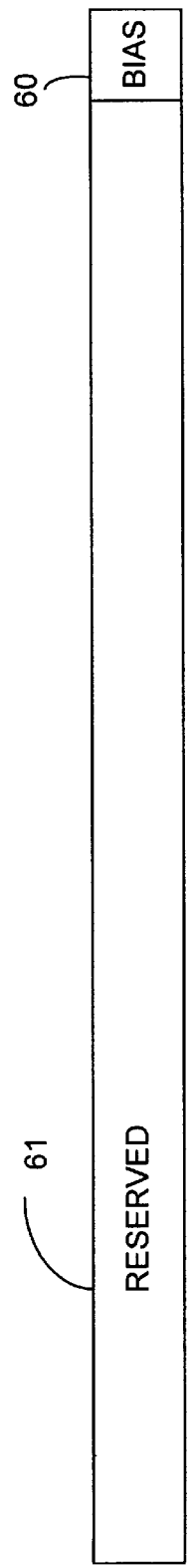
FIG. 6 is a layout of the instruction that shows the bias hint field that is utilized with the present invention.

FIG. 6 shows the Load-Bias instruction with the Load-Bias field 60. This Load-Bias field 60 indicates that any of the load instructions utilizing the bias feature will request and hint to maintain a private status on the data location loaded.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A multiprocessor cache memory apparatus comprising:
    a means for requesting, for a processor, a private copy of accessed data at a data location in the cache memory;
    a means for determining if said requested data location is held as a private copy;
    a means for maintaining said copy of accessed data as private until a cache memory releasing event occurs;
    a means for detecting a memory releasing event, said memory releasing event detecting means including a means for detecting an expiration of a delay timer;
    a means for detecting a snoop to said data location in the cache memory held as private;
    a means for queueing any snoops to said data location in the cache memory held as private; and
    a means for processing all snoops held in the order received when said cache memory releasing event occurs.

2. The apparatus of claim 1, wherein said memory releasing event detecting means further comprises:
    means for detecting a second memory request reference by said processor.

3. The apparatus of claim 1, wherein said memory releasing event detecting means further comprises:
    means for detecting an execution of a compare and exchange instruction.

4. The apparatus of claim 1, further comprising:
    means for testing if said copy of accessed data is the same value as when requested.

5. The apparatus of claim 4, further comprising:
    means for indicating a bad data access when said testing means determines that said copy of accessed data is not the same value as when requested.

6. A method for use in multiprocessor cache memory apparatus, the method comprising the steps of:
    requesting a private copy of accessed data at a data location in the cache memory, said request for a processor causing a bus access;
    determining if said accessed data at said data location is held as a private copy;
    maintaining the requested copy of accessed data as private;
    detecting a snoop to said accessed data at said data location in the cache memory held as private;
    queueing any snoops to said accessed data at said data location in the cache memory held as private;
    detecting a cache memory releasing event;
    releasing the private copy of accessed data; and
    processing all snoops held in the order received when said cache memory releasing event occurs.

7. The method of claim 6, wherein the detecting a memory releasing event step further comprises:
    detecting an accessing of said bus a second time by said processor that requested said private copy of accessed data.

8. The method of claim 5, wherein the detecting a memory releasing event further comprises:
    detecting an execution of a compare and exchange instruction.

9. The method of claim 5, further comprising the step of:
    testing if the copy of accessed data is the same value as when requested.

10. The method of claim 9, wherein said testing step further comprises the step of:
    indicating a bad data access when said testing of the copy of accessed data is not the same value as when requested.

11. A multiprocessor cache memory apparatus comprising:
    logic configured to request a private copy of accessed data, at a data location in the cache memory, for a processor using a bus access, said logic accepting said accessed data as private;
    logic configured to maintain said requested copy of accessed data as private until a cache memory releasing event occurs;
    logic configured to detect a snoop to said accessed data at said data location in the cache memory held as private;
    logic configured to queue any snoops to said accessed data at said data location in the cache memory held as private;
    logic configured to detect said cache memory releasing event, said cache memory releasing event detect logic including a logic configured to detect an expiration of a delay timer;
    logic configured to release said requested private copy of accessed data when said cache memory releasing event occurs; and logic configured to process all snoops held in the order received when said cache memory releasing event occurs.

12. The apparatus of claim 11, wherein said logic configured to detect said cache memory releasing event further includes:

logic configured to detect a second memory request with reference of said bus a second time by said processor that requested said private copy of accessed data.

13. The apparatus of claim 11, wherein said logic configured to detect said cache memory releasing event further includes:

logic configured to detect an execution of a compare and exchange instruction.

14. The apparatus of claim 11, further comprising:

logic configured to test if said copy of accessed data is the same value as when requested.

15. The apparatus of claim 11, further comprising:

logic configured to indicate a bad data access when said testing determines that said copy of accessed data is not the same value as when requested.

* * * * *

UNITED STATES PATENT AND TRADEMARK OFFICE
CERTIFICATE OF CORRECTION

PATENT NO.    : 6,128,706
DATED         : October 3, 2000
INVENTOR(S)   : William R. Bryg et al.

It is certified that error appears in the above-identified patent and that said Letters Patent is hereby corrected as shown below:

<u>Column 6,</u>
Lines 34 and 38, delete "claim 5" and insert therefor -- claim 6 --

Signed and Sealed this

Sixth Day of May, 2003

JAMES E. ROGAN
*Director of the United States Patent and Trademark Office*